Patented Oct. 17, 1950

2,526,395

UNITED STATES PATENT OFFICE 2,526,395

VINYL CHLORIDE RESIN PLASTICIZED WITH DI-2,5 ENDOMETHYLENE $\Delta^3$ TETRAHYDROBENZYL SEBACATE

Joseph Nichols, New York, N. Y., and Lino J. Radi, Somerville, N. J., assignors to Interchemical Corporation, New York, N. Y., a corporation of Ohio No Drawing. Application October 29, 1949, Serial No. 124,516

1 Claim. (Cl. 260—31.8)

The present invention relates to improvements in plastic compositions. More specifically the invention relates to new and useful plastic compositions containing a vinyl resin of the class of vinyl chloride homopolymers, vinyl chloride-vinyl acetate copolymers and vinyl chloride-vinylidene chloride copolymers plasticized with di-2,5-endomethylene-$\Delta^3$-tetrahydrobenzyl sebacate.

The invention is based on the discovery that vinyl chloride homopolymers, vinyl chloride-vinyl acetate copolymers and vinyl chloride-vinylidene chloride copolymers are compatible in all proportions with di-2,5-endomethylene-$\Delta^3$-tetrahydrobenzyl sebacate and that this particular sebacate ester plasticizes the vinyl resins without seriously affecting other very desirable properties of the vinyl resin.

Di-2,5-endomethylene - $\Delta^3$ - tetrahydrobenzyl sebacate is readily obtained by esterifying one mole of sebacic acid with two moles of 2,5-endomethylene-$\Delta^3$-tetrahydrobenzyl alcohol. 2,5-endomethylene-$\Delta^3$-tetrahydrobenzyl alcohol is an ethylenically unsaturated alcohol resulting from the Diels-Alder condensation of cyclopentadiene with allyl alcohol, e. g. according to United States Patent No. 2,352,606.

For the purposes of the present invention it does not appear that the sebacate ester need be purified. For instance, in most of the experimental work which has been carried out to determine the usefulness of the sebacate ester as a plasticizer, a product having an acid number of 3.9, a viscosity of 2.6 poises and a distillation range at 1 mm. pressure of about 224° to 233° C. has been used. This product appears to contain a minor amount of unreacted starting material or maybe minor amounts of volatile by-products. Its iodine number also indicates that it is contaminated. The theoretical iodine number for di-2,5-endomethylene-$\Delta^3$-tetrahydrobenzyl sebacate is 125, however the iodine value of above described product is usually about 115. This indicates that a minor amount of the double bonds in the ester have been destroyed, perhaps by polymerization.

The plasticizer can be incorporated into the vinyl resin in any desirable manner. Where vinyl coatings are applied using solutions of soluble vinyl resins the plasticizer can be dissolved with the vinyl resin. Where it is desired to make vinyl resin extrusions, e. g. for cable and wire coatings, the plasticizer is advantageously milled into the vinyl, for instance on a roll mill.

As is conventional in the art of plasticizing vinyl resins, the plasticizer of the present invention is used in any amount sufficient to produce the desired plasticizing effect, usually in the range of 10 to 50 parts plasticizer to 90 to 50 parts of vinyl resin.

The following examples in which the parts are by weight are given to further illustrate plasticized vinyl resin compositions made in accordance with the invention.

EXAMPLE 1

A clear lacquer was prepared by dissolving 75 parts of vinyl chloride-vinyl acetate copolymer (85.5 to 90.5% vinyl chloride, average mol. wt. 16,000, (viscosity method) e. g. Vinylite VYNS) and 25 parts of di-2,5-endomethylene-$\Delta^3$-tetrahydrobenzyl sebacate (boiling range at 1 mm. pressure 224° to 233° C.) in a suitable solvent such as methyl ethyl ketone. Clear films of 7 mils thickness were cast from the solution on glass plates and allowed to air dry at room temperature for 4 hours, and then dried for 2 hours at 125° F. The films were then conditioned for testing by drying them over calcium chloride for 48 hours. In general appearance the films were clear and transparent, and had very good flexibility. The films had good gasoline resistance as indicated by the fact that they retained their clarity, toughness, and flexibility after being immersed in high test aviation gasoline for 72 hours at 78° F.

EXAMPLE 2

Plasticized films similar to the films of Example 1, but extended with clay as an inert filler, were prepared by dispersing 40 parts of clay in a solution of 40 parts of vinyl resin (same as Example 1) and 20 parts of plasticizer (same as Example 1), and coating the composition on 4 oz. cotton sheeting to a dry film thickness of about 7 mils. The films were dried and conditioned as in Example 1.

In general appearance the extended films showed good flexibility, and no crazing or piping. High temperature sticking, i. e. heat block tests, indicated that the films were superior to similar films plasticized with di-2-ethyl-hexyl phthalate and other conventionally used vinyl resin plasticizers. Also the extended films had good abrasion resistance, and good resistance to dry cleaning fluids such as carbon tetrachloride.

The table shows typical properties of three different commercial vinyl plastics plasticized according to the invention with di-2,5-endomethylene-$\Delta^3$-tetrahydrobenzyl sebacate. The properties listed in the table were determined on plasticized moldings of the plastics containing 50 parts of plasticizer to 100 parts of vinyl resin. The moldings were prepared by thoroughly premixing the plasticizer and vinyl resin and then milling the premix on a heated 2-roll mill. The milling temperatures listed in the table are the minimum milling temperatures for satisfactory results. The milled stock was allowed to cool for 3 hours, then molded at 300° F. for 10 minutes. Then the molded stock was allowed to cool under pressure before removing it from the molds.

Table

| Vinyl Resin | Geon 101 [1] | Vinylite VYNW [2] | Marvinol #1 [3] |
|---|---|---|---|
| Milling time in minutes | 10 | 10.7 | 9.3 |
| Roll mill temperature, °F | 285 | 285 | 285 |
| Modulus @ 100% | 2,058 | 2,058 | 2,060 |
| Ultimate Elongation | 300 | 300 | 300 |
| Ultimate tensile strength, lbs./sq. in | 3,177 | 3,170 | 3,176 |
| Shore hardness | 84 | 83 | 84 |
| Tear resistance, P. P. I | 696 | 696 | 690 |

[1] Geon 101 is a vinyl chloride-vinyl acetate copolymer containing about 98% vinyl chloride.
[2] Vinylite VYNW is a vinyl chloride-vinyl acetate copolymer containing 93-95% vinyl chloride.
[3] Marvinol #1 is a vinyl chloride-vinyl acetate copolymer containing about 95% vinyl chloride.

From the data recorded in the table it is apparent that the novel plasticizer of the present invention is a good plasticizer for extruded or molded vinyl plastics, such as coatings for wires and cables. The relatively low modulus of the composition and the low milling temperatures and low milling times indicate relatively high solvency efficiency of the plasticizer for the vinyl resins. Also, the molded compositions possess good tear resistance and tensile strength, being equal or superior in this respect to similar compositions plasticized with conventional plasticizer.

Vinyl plastics plasticized with the novel plasticizer of the present invention have very satisfactory electrical properties for use in cable coatings. Typically a vinyl chloride-vinyl acetate copolymer plastic, containing 93 to 95% vinyl chloride and having an average molecular weight of 24,000, when plasticized with one-half its weight of di-2,5-endomethylene-$\Delta^3$-tetrahydrobenzyl sebacate, has a resistivity of $1.8 \times 10^7$ megohms per cubic centimeter after four weeks in water at room temperature. Other electrical properties of the water treated plasticized vinyl plastic are: a dielectric constant at 1000 cycles of 3.38 and a power factor at 1000 cycles of 6.55%.

Since changes may be made in the above described examples of the invention, it is intended that the description shall be interpreted as illustrative and not as limiting the valid scope of the appended claim.

We claim:

A plasticized resinous product comprising di-2,5-endomethylene-$\Delta^3$-tetrahydrobenzyl sebacate and a vinyl resin selected from the group consisting of vinyl chloride homopolymers, vinyl chloride-vinyl acetate copolymers, and vinyl chloride-vinylidene chloride copolymers.

JOSEPH NICHOLS.
LINO J. RADI.

No references cited.